Feb. 8, 1966     G. LEUCCI     3,233,609
IRRIGATION DEVICE USED DURING POST-OPERATIVE PROCEDURES
Filed April 6, 1961     2 Sheets-Sheet 1
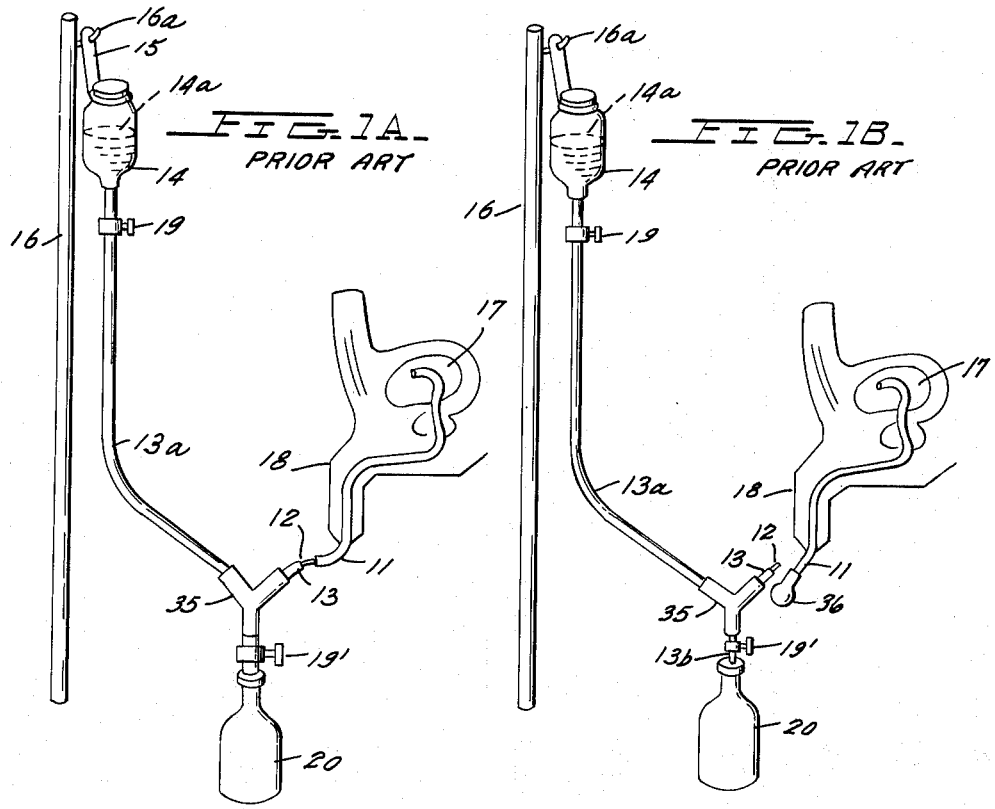
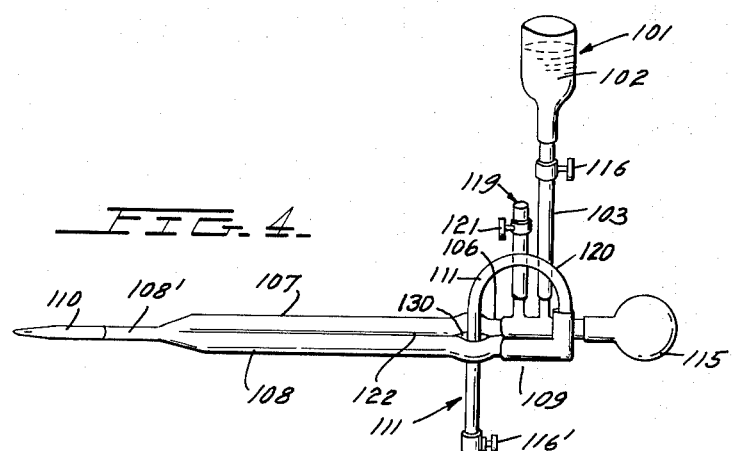
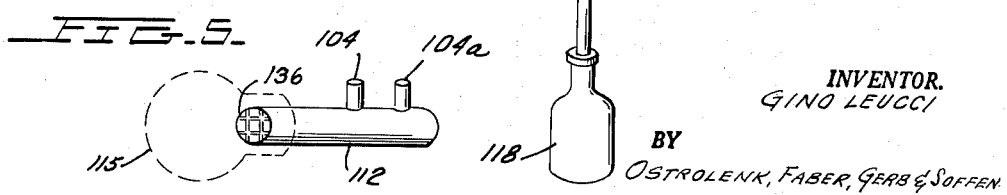
INVENTOR.
GINO LEUCCI
BY
OSTROLENK, FABER, GERB & SOFFEN
ATTORNEYS

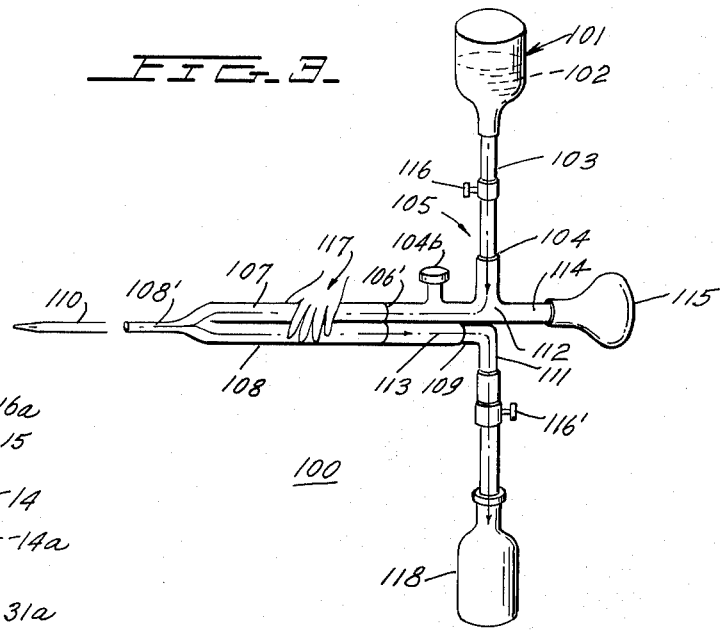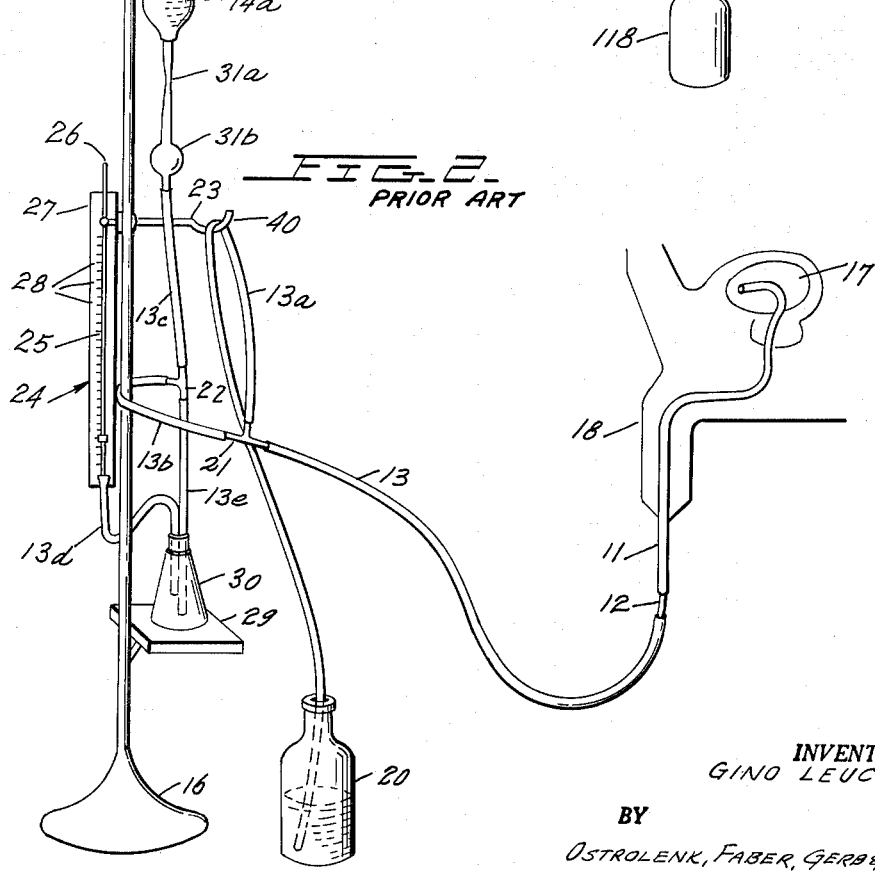

3,233,609
IRRIGATION DEVICE USED DURING POST-OPERATIVE PROCEDURES
Gino Leucci, Philadelphia, Pa., assignor of one-half to Henry Mailman
Filed Apr. 6, 1961, Ser. No. 101,094
7 Claims. (Cl. 128—227)

My invention relates to surgical irrigation apparatus, and more particularly to irrigation apparatus having novel means to facilitate the removal of blood clots which may occur during the irrigation operation.

Irrigation quite often becomes necessary as a post-operative procedure for operations involving the urinary bladder and the prostate gland. During the healing process of the affected organ, undesirable formations are formed which must be removed from the system by sterile methods.

The procedure which is normally used is that of catheterization; that is, the introduction of a catheter into the bladder into which a sterile fluid is injected to properly cleanse the bladder and the organs connected thereto. The sterile fluid is then drained from the system by gravity.

Another procedure in which the irrigation operation must first be performed is that of cystoscopy, which is the visual examination of the urinary bladder by means of an instrument known as the cystoscope. In the examination of actively bleeding or badly infected bladders, it is advantageous to irrigate the bladder by means of a catheter before the introduction of the cystoscope so that a more thorough examination may be made.

The irrigation procedure is also utilized as a method for treating the urinary bladder in cases where surgery is not performed, such as, for example, in chronic infections, paralytic bladder.

One method which is presently used to irrigate the urinary bladder involves the introduction of a sterile fluid into the bladder by means of a catheter until a predetermined amount of fluid is introduced into the bladder. This is simply a gravity-feed operation. The tube which connects the catheter to the fluid source has a branch leading to a waste container. The branch path clamp is closed during the period that the fluid is introduced into the bladder. When the bladder is satisfactorily irrigated, the fluid source is then closed off from the tube connecting the source to the catheter and the branch path which is at a level which is lower than that of the bladder causes the fluid in the bladder to be drained off from the bladder by gravity and placed into a container for either disposal or for subsequent examination. It is extremely important to provide an irrigation set-up which is kept completely sterile so that no pathogenic material is introduced into the patient's body during the irrigation operation which material might have harmful effects upon the patient.

Another irrigation method presently in use employs what is commonly known as a tidal drainage set-up. This apparatus permits the continuous introduction and drainage of the fluid automatically. The bladder is filled to a predetermined point by gravity-feed means. At this predetermined point the intracystic pressure of the urinary bladder causes a vacuum which is formed in the apparatus to be automatically broken, whereupon the bladder is then emptied by siphonage. The irrigation step is not re-initiated until the bladder is completely drained of the sterile fluid, at which time the irrigation step automatically begins. The process is repeated in a regular cycle until the sterile fluid supply is depleted.

The intermittent and the continuous or tidal drainage operations have the disadvantage of requiring cessation of the irrigation operation upon the occurrence of an obstruction in the catheter due to the presence of bloodclots or mucus which are being washed away under the cleansing pressure of the sterile fluid. In order to reinitiate normal flow of the sterile fluid through the urinary bladder, it becomes necessary to remove the fluid source from the tube connecting the fluid source to the catheter and connect the tube to a flexible hand-pump or bulb capable of developing a vacuum of the magnitude necessary to release the obstruction. The fluid source is then reconnected to the tube permitting the irrigation process to be resumed. A similar operation is necessary to release an obstruction arising in the continuous or tidal drainage set-up.

Intermittent interruptions of this nature due to obstructions which occur in the irrigation apparatus cause large amounts of fluid to escape from the flexible connecting tubes during the time that the fluid source is removed and replaced by the hand-pump. The escaping fluid dampens the bed sheets, the patient's bed-clothes and possibly the operator, necessitating a complete change of the bed sheets and bed-clothing. In addition, the need for disengaging the fluid source from the catheter destroys the isolation of the system from the surrounding elements which exists prior to the obstruction removal operation. The need for such isolation from the surrounding elements is highly important since the harmful effects which may occur due to the introduction of pathogenic substances into the patient's internal system is especially serious due to the patient's weakened condition.

The irrigation device of my invention is so arranged as to provide complete isolation from the surrounding environment throughout the entire irrigation operation, regardless of whether the apparatus is to be used for either continuous or intermittent irrigation. The isolation provided by my apparatus is not destroyed upon the occurrence of an obstruction due to the passage of a bloodclot or mucus through the apparatus.

My invention comprises an inlet tube for receiving the fluid source, and an outlet tube through which the fluid may be siphoned after passing through the urinary bladder. Other connections are provided for a hand-pump and a catheter respectively. The tubular portions adjacent the catheter are formed of a flexible material of relatively large diameter which may be utilized to aid in the removal of relatively small blood-clots. The hand-pump is provided for removal of larger blood-clots which will not respond to the manipulation of the tubular portion adjacent the catheter. The apparatus is easily adaptable for use as either an intermittent or a continuous irrigation apparatus. Since the entire apparatus is formed of flexible tubing, it may be conveniently folded into a compact package thereby facilitating storage, shipment and handling of the apparatus. The simplicity of the apparatus makes it readily usable by anyone without the need for lengthy instruction.

The tubular portions adjacent the catheter are arranged so as to be substantially physically parallel to each other permitting their manual manipulation for the purpose of creating a sucking action to remove any obstruction present in the apparatus. Their inner diameters are greater than the catheter inner diameter permitting blood clots of any size to easily pass through.

The tubular portions may be designed to have tapered inner diameters so as to regulate the magnitude of the sucking action depending only upon which point the tubular portions are gripped. As another modification, the tubular members may be designed to each have bulbar portions adjacent one another to create a sucking action greater in magnitude than that which is created by manipulating the remaining adjacent portions of the tubular members.

It is therefore, one object of my invention to provide an irrigation device having a novel design to prevent the introduction of foreign matter into the irrigation set-up during the irrigation operation.

Another object of my invention is to provide a novel irrigation system having first and second fluid conveying members which are hydraulically and physically arranged in parallel fashion to aid in the removal of obstructions occurring in the apparatus.

Still another object of my invention is to provide a closed system for irrigating a bladder wherein novel means are provided to remove obstructions occurring in the system, thus avoiding the need for interrupting the isolation of the system from its surroundings for the removal of an obstruction occurring therein.

Another object of my invention is to provide an irrigation apparatus having novel means for removing blood clots which may disturb the irrigation operation.

Another object of my invention is to provide an irrigation apparatus which includes first means for removing relatively small blood-clots and second means for removing larger blood-clots which may be introduced into the apparatus during the irrigation operation, thus eliminating the need for a catheterization tray each time an obstruction occurs.

Another object of my invention is to provide an irrigation apparatus which is extremely light in weight and which may be used by anyone without the need for lengthy, complex instruction.

These and other objects of my invention will become apparent in the following description and claims taken in conjunction with the accompanying drawings in which:

FIGURES 1, 1a and 1b show the intermittent drainage operation of the prior art.

FIGURE 2 shows the tidal drainage apparatus of the prior art.

FIGURE 3 shows the apparatus of my invention used in the intermittent drainage operation.

FIGURE 4 shows the apparatus of my invention employed in the continuous drainage operation.

FIGURE 5 is an end view of a portion of the apparatus of FIGURES 3 and 4.

Referring now to the drawings, FIGURE 1a shows an intermittent irrigation apparatus which consists of a flexible catheter 11, flexible tubings 13 and 13a, and a sterile container 14 which contains the fluid 14a used to drain the urinary bladder 17. Many solutions are used for irrigation of the bladder depending upon the disease affecting the organ. One exemplary solution is the normal saline solution which is supplied to hospitals in sterile bottles of 1,000 cc. capacity. Another typical solution employed in the irrigation operation is acetyl-beta-methylcholine which is a parasympathetic nerve stimulant useful in the treatment of bladder dysfunction characterized by urinary retention due to hypotonia of the detrusor muscles and spasm of the sphincters. Other fluids may be used, depending upon the treatment needed by the individual patient and the above solutions are set forth merely as exemplary sterile fluids.

When the catheter 11 is properly introduced into the bladder 17 through the male organ 18, the flexible tube 13a is then connected to the catheter 11 by means of a piece of straight connecting tubing 12, tubing 13 and Y-shaped connector 35. The fluid container 14 is supported by stand 16 having a hook 16a which engages the strap 15 surrounding the neck of container 14. Clamp 19 is initially adjusted to prevent flow of the solution 14a while the apparatus is being set-up.

As soon as the apparatus is properly set-up, clamp 19 may be loosened, permitting the fluid 14a to flow downward under control of the force of atmospheric pressure into the urinary bladder 17. The fluid 14a is prevented from flowing into waste container 20 by closing clamp 19′ on tubing 13b.

When the bladder 17 is completely filled with solution 14a, the bladder 17 is drained by closing clamp 19 to stop the flow of fluid 14a and opening valve 19′ on tubing 13b. The intravesicle pressure urges the fluid into waste container 20. Irrigation may be resumed by opening valve 19 and releasing valve 19′.

Upon the occurrence of blood clots or mucus in the foley catheter 11 due to the cleansing properties of the solution the catheter dimensions prevent the unobstructed flow of the solution 14a requiring removal of the obstruction.

To remove the obstruction, tubing 13 is separated from straight connection tubing 12 and is replaced by handpump or syringe 115 as shown in FIGURE 1b. By sqeezing and releasing hand pump 36, a suction is created to withdraw the obstructions. Upon removal of the obstruction, the apparatus may be rearranged as shown in FIGURE 1a for resumption of the irrigation process. In addition to syringe 36, a quantity of sterile fluid from another source (not shown) is needed in the withdrawal operation in order that a sufficient amount of fluid is present in the syringe 36, tube 13 and catheter 11 during the removal operation of the obstruction.

The separation of tube 13 from straight tubing 12 for the purpose of inserting syringe 36 destroys the isolated condition of the apparatus which must be kept sterile throughout the irrigation operation in order to shield the patient from infection.

The tidal drainage operation comprises filling and emptying of the urinary bladder such as is performed by the prior art apparatus shown in FIGURE 2. The set-up consists of a sterile fluid container 14 which is supported by strap 15 and hook 16a to stand 16. The lower end of fluid container 14 is connected to a flutter valve 31a and dropper 31b which is, in turn, connected to a reservoir 30 by tube 13c, T-shaped tubing 22 and tube 13e. Flutter valve 31a and dropper 31b act to regulate the rate of flow of the sterile solution 14a. Catheter 11 is connected to the fluid source and T-shaped tubing 22 by means of tubing 13b, T-shaped tube 21, tubing 13 and straight connecting tubing 12. A waste container 20 is connected to T-shaped tube 21 by tubing 13a which is looped over support 23 for a purpose to be more fully described.

Manometer 24 having a transparent tube 25 which is open at end 26, is mounted to a panel 27 having gradations 28, is connected to reservoir 30 by tubing 13e. Manometer 24 is utilized to measure intracystic pressure of the bladder.

The operation of the tidal drainage apparatus shown in FIGURE 2 is as follows: The solution 14a in container 14 moves downward by gravity through flutter valve 31a and dropper 31b, tubing 13c and 13e, in order to fill up reservoir 30. Reservoir 30 is filled as is tube 13e and tube 25 of manometer 24 up to the level of T-shaped tube 22. When the fluid reaches the level of tube 22, it will then move downward by gravity through tube 13b, T-tube 21, tube 13 and tube 12 through catheter 11 into the urinary bladder 17. This flow will continue until urinary bladder 17 is completely filled with sterile solution 14a. At this time, the pressure exerted by the bladder 17 upon the sterile solution is greater than exerted by the fluid 14a, causing the sterile fluid to rise both in the tube 25 and manometer 24 and in tube 13a. As soon as the level of fluid 14a is sufficiently high to reach the point 40 of tubing 13a and then siphoned down tube 13a into waste container 20, a vacuum builds up in tubing 13a causing the sterile fluid which is in the urinary bladder 17 to be completely drained into waste container 20. At this time the pressure existing in the urinary bladder 17 is substantially less than the pressure of the fluid, causing the fluid source 14 to resume its flow downward through flutter valve 31a and dropper 31b. This initiates the irrigation of urinary bladder 17. This alternate irrigation and siphonage is a continuously repetitive cycle, and is terminated only by the depletion of the fluid 13a in container 14. The height 40 of tubing 13a may be moved up or down by adjusting bracket 23, depending upon the intravesicle pressure which is desired in the irrigation of any particular patient. Here we have the same disadvantage seen in the intermittent irrigation system.

Although the irrigation apparatus as shown in FIGURE 2 appears to be a completely sterile set-up, completely isolated from its surroundings, to protect the patient from any possible infection, during the siphonage portion of the tidal drainage cycle, if a blood-clot attempts to be siphoned through catheter 11 and tubing 13 and has dimensions such that its passage through catheter 11 and tubing 13 is prevented, the irrigation set-up of FIGURE 2 must be disengaged, usually at the point where T-shaped tubing 21 is connected to tubing 13, so that a hand-pump 115 such as shown in FIGURE 3 may be connected to tubing 13 for the removal of the blood-clot so that the irrigation operation may be resumed. The irrigation apparatus will result in leakage of the fluid contained in the tubing causing the bed-clothes and bedding of the patient to become flooded and also creating the possibility of foreign matter being introduced into the irrigation set-up at the point where T-shaped tube 21 and tubing 13 were severed in order to engage the hand-pump (not shown) to tubing 13 for removal of the obstructions.

FIGURE 3 shows the irrigation apparatus 100 of my invention which consists of a container 101 housing a sterile fluid solution 102. Container 101 is connected to the inlet 104 of tubular apparatus shown generally as 105 by flexible tubing 103. The other opening 104a, the purpose of which will be more fully described, is sealed by plug or stopper means 104b. A flexible hand-pump 115 is mounted to engage opening 114 of tubular apparatus 105. Tubing 111 engages opening 29 of L-shaped connecting tube 109 serving to connect tubular apparatus 105 to waste container 118. Clamp 116 engaging tubing 103, and clamp 116' engaging tubing 111 serve as fluid control valves, as will be more fully described. Tubular apparatus 105 consists of tube member 112, tubes 107 and 108 and connecting member 109. Tubes 107 and 108 are fused to one another at point 108' to form a single tubular configuration which is joined to any suitable catheter, such as catheter 110. An adhesive material, such as glue for example, is placed between the sides of tubes 107 and 108 to hold the tubes to one another. The operation of the irrigation set-up shown in FIGURE 3 is as follows: Sterile solution 102 contained in sterile bottle 101 is passed downward through input tube 103 into the opening 104 of the tubular apparatus shown generally as 105. The fluid passes from inlet 104 of rigid tube member 112 to outlet 106 of T-shaped tube 112 and then through flexible tube 107 and fused tubing portion 108' to catheter 110 which is properly inserted into the bladder of the patient (see FIGURES 1b and 2). The sterile fluid is prevented from passing from the urinary bladder into outlet tube 111 by clamp 116' which is adjusted to prevent any fluid from passing to waste container 118.

In order to siphon the solution 102 which is now in the bladder, clamp 116 is adjusted to prevent the flow of any sterile solution from container 101 into the tubing apparatus 105. Clamp 116' is then loosened to permit the solution to flow from the urinary bladder such that the fluid flows from catheter 110 through tube 108, through tubing 113 and 111 into waste container 118. The irrigation may then be repeated simply by shutting clamp 116' and opening clamp 116 in that order. If, during the siphonage portion of the irrigation cycle, a blood-clot obstructs the flow of the solution 102 from waste container 118, the blood-clot may be removed as follows: Clamps 116 and 116' are adjusted to prevent the flow of solution 102 from container 101 to apparatus 105 and from catheter 110 to waste container 118 respectively. The operator (not shown) then places his hand 117 around tubes 107 and 108, and tubes 107 and 108 are then squeezed together and released in a vigorous cyclical fashion. This creates a sucking action which withdraws the blood-clot.

If this pumping action of tubes 107 and 108 fails to remove the blood-clot, the hand pump of bulb 115 may be squeezed together and released vigorously in the same manner as tubes 107 and 108, retaining clamps 116 and 116' in their closed position. Hand-pump 115 inherently has a greater suction potential than the hand squeezing operation of tubes 107 and 108. The squeezing and releasing of tubes 107 and 108 should be resorted to initially, however, since the sucking action which is created places a stress upon the urinary bladder of the patient making the patient quite uncomfortable. For this reason, it can be seen that the hand-pump 115 should be resorted to only if the pumping action of the tubes 107 and 108 fails to remove the blood-clot.

It can be seen from the following description that none of the components of irrigation apparatus 100 need be removed or disengaged at any time during the irrigation operation, even during the existence of a blood-clot which obstructs and hence prevents the irrigation operation. This permits the irrigation set-up which initially is a sterile set-up to remain sterile throughout the entire operation.

FIGURE 4 shows my apparatus employed in a continuous or tidal drainage set-up. The set-up of FIGURE 4 differs from the set-up shown in FIGURE 3 in that tube 111 is arranged to form a loop 120. The purpose of loop 120 is to regulate the intracystic pressure in the same manner as tubing 13a of FIGURE 2. The opening 104a which is shown plugged by stopper 104b in FIGURE 3 is utilized to accommodate the tube 13d from manometer 24 (see FIGURE 2) for the purpose of measuring intravesical pressure.

The tubes 107 and 108 in FIGURE 4 are joined along their lengths in the same manner as described above with reference to FIGURE 3 except for a small portion adjacent tubular members 112 and 109. At this point, tubes 107 and 108 may be separated slightly to form an opening 130. L-shaped member 109 is inserted into tube 108 in the manner shown in FIGURE 4 permitting tubing 111 to be inserted through opening 130. Since the opening 130 is small, the mechanical friction between tubing 111 and tubes 107 and 108 holds tubing 111 rigidly in place for a purpose to be more fully described.

The operation of the apparatus shown in FIGURE 4 is as follows: Sterile solution 102 flows downward under the control of gravity from sterile container 101 into the urinary bladder by means of inlet tube 103, inlet 104 of tubular member 112, flexible tube 107, fused tubing portion 108' and catheter 110. The sterile solution 102 is prevented from flowing into waste container 118 by the loop 120 formed in flexible tubing 111. Flexible tubing 111 is looped by moving tubing 111 up or down a predetermined amount in opening 130. As soon as the pressure exerted by the urinary bladder (not shown) is greater than the pressure of sterile solution 102, the solution rises in loop 120 until it reaches the apex of the loop and begins to flow downward into container 118. The flow of the solution 102 from the loop 120 causing the solution in the urinary bladder (not shown) to be completely drained into waste container 118. The flow of sterile solution 102 from the urinary bladder (not shown) does not subside until the bladder is completely drained. At this time, the pressure exerted by the urinary bladder is terminated and the solution contained in sterile container 101 again flows into the urinary bladder. This operation continues in a cyclical fashion until the solution 2 is completely dissipated from the sterile container 1.

If the set-up is clogged by the presence of any blood or mucus, the material may be removed by adjusting valves or clamps 116, 116', and 121 so that they impede the flow of any solution in either direction. Flexible tubes 107 and 108 are then grasped by the operator and squeezed together and released in a vigorous fashion. This creates a sucking action which acts to withdraw the blood-clot from the catheter.

As shown in FIGURE 5, a screen 136 is placed at the extremity of tubular member 112 which screen serves to prevent the entrance of obstructions such as blood-clots or mucus into the handpump 115 shown in FIGURE 5 in dotted fashion.

If this removal operation does not prove successful, handpump 115 is squeezed together and released vigorously in order to remove the constricting blood-clot 1. Flexible tubing 119 is used to connect a manometer such as manometer 24 shown in FIGURE 2 in order to measure intracystic procedure of the urinary bladder. Normally, the sucking action which is created by the squeezing and releasing of flexible tubes 107 and 108 is adequate to remove the blood-clot. Under these circumstances, no element of the system need be opened in order to remove the blood-clot.

It can be seen from the foregoing that I have provided an irrigation apparatus which is light in weight, simple to use and which retains a sterile condition throughout the entire irrigation operation.

Although I have described my invention in connection with the preferred embodiments thereof, I prefer to be bound not by the disclosure and drawings, but only by the appending claims.

I claim:

1. Apparatus for irrigating the bladder of a patient comprising first flexible tube means for supplying sterile fluid, second catheterizing means connected to said first means for transferring said fluid to said bladder, third flexible tube means for withdrawing said sterile fluid from said bladder through said second means, said first and third flexible means adapted to cooperate with one another to form a manually operable means for removing constrictions occurring in said apparatus, flexible hand pump means connected to said first means acting as alternative manually operable means for removing constrictions occurring in said apparatus, said first and third means having substantially equal diameters and being adjacent and parallel to one another; the diameters of said first and third means being substantially greater than the diameter of said second means to facilitate removal of constrictive matter passing from the bladder.

2. Apparatus for irrigating the bladder of a patient comprising first flexible tube means for supplying sterile fluid, second catheterizing means connected to said first means for transferring said fluid to said blade, third flexible tube means for withdrawing said sterile fluid from said bladder, said first and third flexible means adapted to cooperate with one another to form a manually operable means for removing constrictions occurring in said apparatus, said first and third means having substantially equal diameters and being adjacent and parallel to one another, said first and third means being fused together at one end to form a common opening adapted to receive said second means; the diameters of said first and third means being substantially greater than the diameter of said second means to facilitate removal of constrictive matter passing from the bladder; adhesive means for joining said first and third means; said first and third means being joined along substantially their entire lengths.

3. Irrigation apparatus for connecting a sterile fluid source and a waste container to a catheter comprising catheter means; a first substantially straight tubular member connected to a sterile fluid source, a second substantially straight tubular member positioned adjacent to and in parallel alignment with said first tubular member, adjacent openings of said first and second tubular members being fused to form a common passageway coupled to said catheter means, the remaining opening of said second tubular member being adapted to pass said sterile fluid to a waste container, said first and second tubular members being formed of a flexible material to permit manual manipulation of said tubular member for removal of constrictions occurring in said apparatus during the irrigation operation; adhesive means for joining said first and third means; said first and third means being joined along substantially their entire lengths.

4. Irrigation apparatus for connecting a sterile fluid source and a waste container to a catheter comprising catheter means; a first substantially straight tubular member connected to a sterile fluid source, a second substantially straight tubular member positioned adjacent to and in parallel alignment with said first tubular member, the adjacent openings of said first and second tubular members being fused to form a common passageway coupled to said catheter means, the remaining opening of said second tubular member being adapted to pass said sterile fluid to a waste container, said first and second tubular members being formed of a flexible material to permit manual manipulation of said tubular members for removal of constrictions occurring in said apparatus during the irrigation operation, the inner diameters of said tubular members each being greater than the inner diameter of said catheter, first and second clamping means connected to said remaining openings of said first and second tubular member respectively, for controlling the flow of said fluid source, said clamping means being adapted to cooperate with said first and second tubular members to facilitate the removal of constrictions occurring in the apparatus; adhesive means for joining said first and second tubular members along substantially all of their entire lengths to facilitate manipulation thereof.

5. A completely closed system for irrigating a bladder comprising catheter means; first means coupled to said catheter means for introducing a sterile fluid into the bladder, second means coupled to said catheter means for draining the bladder, said first and second means being adapted to cooperate with each other to aid in the removal of constrictions occurring in said system during the irrigation operation, thereby avoiding the need for opening said closed system at any time during the irrigation operation said first and second means comprising substantially straight tubular members positioned adjacent and parallel to one another, adjacent openings of said tubular members being fused together to form a common passage for receiving said catheter means, the inner diameters of said tubular members being substantially greater than the inner diameter of said catheter; adhesive means for joining said first and second tubular members along substantially all of their entire lengths to facilitate manipulation thereof.

6. Irrigation apparatus for connecting a sterile fluid source and a waste container to a catheter comprising catheter means; a first substantially straight tubular member connected to said sterile fluid source, a second substantially straight tubular member positioned adjacent to and in parallel alignment with said first tubular member, adjacent openings of said first and second tubular members being fused to form a common passageway coupled to said catheter means, the remaining opening of said second tubular member being adapted to pass said sterile fluid to a waste container, said first and second tubular members being formed of a flexible material to permit manual manipulation of said tubular member for removal of constrictions occurring in said apparatus during the irrigation operation, adhesive means between the adjacent sides of said first and second straight tubular members for securing said members to one another.

7. Irrigation apparatus for connecting a sterile fluid source and a waste container to a catheter comprising catheter means; a first substantially straight tubular member connected to said sterile fluid source, a second substantially straight tubular member positioned adjacent to and in parallel alignment with said first tubular member, adjacent openings of said first and second tubular members being fused to form a common passageway coupled to said catheter means, the remaining opening of said second tubular member being adapted to pass said sterile fluid to a waste container, said first and second tubular members being formed of a flexible material to permit manual manipulation of said tubular member for removal of constrictions occurring in said apparatus during the irrigation operation, adhesive means between the adjacent sides of said first and second straight tubular members for securing said members to one another, said adhesive means being placed along adjacent sides of said first and second straight tubular members extending from said common passageway substantially to the opposite ends, a portion of said adhesive means near said opposite ends being removed to permit a tube connected to said remaining opening of said second tubular member to be inserted between said first and second tubular members.

References Cited by the Examiner

UNITED STATES PATENTS

| | | | |
|---|---|---|---|
| 598,407 | 2/1898 | Armstrong | 128—240 |
| 1,112,107 | 9/1914 | Anderson | 128—240 |
| 1,852,427 | 4/1932 | Lopatin | 128—239 |
| 2,022,742 | 12/1935 | Salerni | 128—227 |
| 2,286,462 | 6/1942 | Chaffin | 128—350 |
| 2,478,876 | 8/1949 | Nelson | 128—227 |
| 2,486,405 | 11/1949 | Henderson | 128—227 |

FOREIGN PATENTS 543,831  2/1932  Germany.

RICHARD A. GAUDET, *Primary Examiner.*

RICHARD J. HOFFMAN, *Examiner.*